United States Patent Office 3,396,148
Patented Aug. 6, 1968

3,396,148
9,10 - BIS(HYDROXYMETHYL) - s - OCTAHYDRO-ANTHRACENE, ITS DERIVATIVES AND POLYESTER RESINS THEREFROM
Marjan Kolobielski, Pittsburgh, Pa., assignor to United States Steel Corporation, a corporation of Delaware
No Drawing. Filed Jan. 23, 1963, Ser. No. 253,273
13 Claims. (Cl. 260—75)

This invention relates to a novel glycol of s-octahydroanthracene, its derivatives and polymers thereof. More particularly, the novel derivatives are a diester and bis (carbonate) monomers, all being starting materials for producing useful condensation polymers.

Some difunctional derivatives of anthracene, such as 9,10-bis(acetoxymethyl) anthracene and 9,10-bis(hydroxymethyl) anthracene, have been described in an article by Miller, Amidon and Tawney, J. Am. Chem. Soc., 77, 2845 (1955). These derivatives are high-melting solid materials, have low solubility in common organic solvents, and are prepared from 9,10-bis(chloromethyl) anthracene, which is a powerful skin irritant. It has now been found that a glycol and derivatives prepared from a partially hydrogenated anthracene such as s-octahydroanthracene have more advantageous properties. My novel compounds are symmetrical, difunctional derivatives of s-octahydroanthracene having the structural formula:

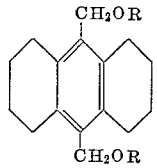

where R is chosen from the group consisting of hydrogen, $COCH_3$ and $COOR_1$, where $R_1$ is chosen from the group consisting of alkyl radicals containing from 1 to 4 carbon atoms and aryl radicals of the benzene series containing from 6 to 8 carbon atoms.

My invention relates to a novel glycol and diester of polycyclic aromatic hydrocarbons, more particularly to a novel symmetrical glycol 9,10-bis(hydroxymethyl)-s-octahydroanthracene represented by the formula:

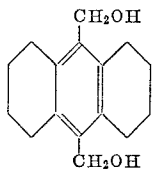

and to its diester 9,10-bis(acetoxymethyl)-s-octahydroanthracene represented by the formula:

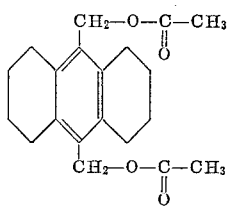

Unlike the anthracene derivatives mentioned previously, my above novel derivatives of s-octahydroanthracene are readily obtainable and have lower melting points and better solubility. Therefore, they are more suitable for producing linear polymers.

In practice, the diester may be prepared by conversion of the corresponding bis-chloromethyl cyclic compound 9,10-bis(chloromethyl)-s-octahydroanthracene by reacting it with anhydrous metal acetate such as sodium acetate, potassium acetate, or lead acetate in acetic acid. This reaction takes place according to the following equation:

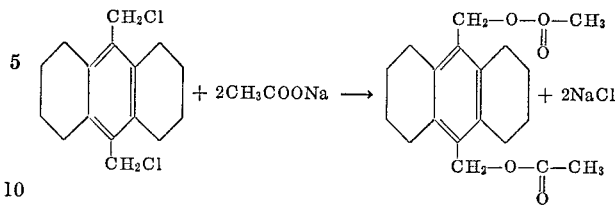

The reaction results in an almost quantitative yield of 9,10-bis(acetoxymethyl)-s-octahydronathracene, which is a valuable product for the manufacture of polyesters by condensing it directly with a suitable dibasic acid, anhydride, or ester.

The diester may be converted to the corresponding novel diol 9,10-bis(hydroxymethyl)-s-octahydroanthracene by saponification with sodium hydroxide. In order to obtain a homogeneous reaction mixture, an appropriate solvent, such as methyl or ethyl alcohol, may be used. The reaction is illustrated by the following equation:

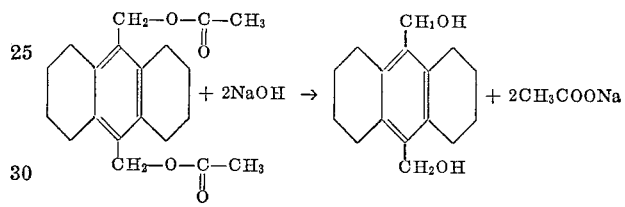

This reaction results in an almost quantitative yield of the 9,10 - bis(hydroxymethyl) - s - octahydroanthracene, which, owing to its symmetrical and hydroaromatic structure, is a valuable glycol for producing linear polymers such as fiber-forming polyesters.

In turn, the diol may be converted to a bis(carbonate) monomer having the following formula:

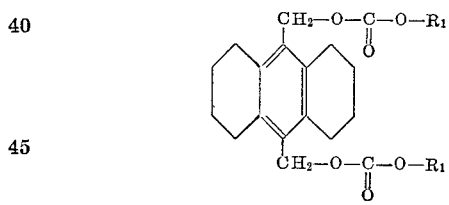

where $R_1$ is chosen from the group consisting of alkyl radicals containing from 1 to 4 carbon atoms and aryl radicals of the benzene series containing from 6 to 8 carbon atoms. In practice, bis(carbonate) monomers may be prepared by condensing 9,10-bis(hydroxymethyl)-s-octahydroanthracene with an alkyl or an aryl chlorocarbonate in the presence of pyridine. A representative bis(carbonate) monomer is 9,10-bis(hydroxymethyl)-s-octahydroanthracene-bis(ethyl carbonate), which may be obtained by reacting the diol with ethyl chloroformate in the presence of pyridine.

Owing to their symmetrical and hydroaromatic structure, the above diester, glycol and bis(carbonate) monomers of s-octahydroanthracene are useful for producing linear polymers such as fiber-forming polyesters and polycarbonates possessing such desirable properties as high melting point and high thermal stability.

In practice the above bis-acetate compound may be esterified with an equimolar amount of a suitable dicarboxylic acid. The dicarboxylic acids particularly useful in the present invention are saturated acids having an even number of carbon atoms in the range of about 2 to 10, including aliphatic as well as aromatic acids. An especially good result has been achieved, for instance, with adipic acid. However, condensation with other shorter aliphatic acids, such as succinic or oxalic, is particularly appropriate when a higher-melting-point polyester resin is required.

The above aromatic glycol may be condensed with an equimolar amount of a suitable dicarboxylic acid or its equivalent, such as its anhydride, ester, or acyl chloride. The dicarboxylic acid esters of $C_1$ to $C_3$ alcohol represent particularly convenient reagents. When esters of dicarboxylic acids are used instead of the acids or their chlorides, then basic catalysts such as sodium methylate or ethylate, lithium aluminum tetraethoxide, calcium hydroxide, or zinc hydroxide are suitable for this reaction. The diesters particularly useful in the present invention are saturated diesters derived from dicarboxylic acids having an even number of carbon atoms in the range of 2 to 10, including aliphatic as well as aromatic acids. Especially good results have been achieved, for instance, with diethyl succinate and dimethyl adipate.

In addition to the linear polyesters above described, novel polyesters derived from carbonic acid, comprising linear highly polymeric polycarbonates may be prepared from the above-described bis(carbonates). These polycarbonates have melting points above 200° C. and contain the following repeating unit:

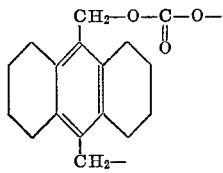

These polycarbonates are valuable products for preparing fibers, film, and other materials. The processes for producing them comprises self-condensation of a bis(carbonate) monomer, in the presence of an ester-interchange catalyst, for example, a metal alkoxide such as sodium alkoxide and titanium alkoxide or an alkali metal hydride, such as sodium hydride. A catalyst which has been found particularly useful is a titanium alkoxide, specifically titanium tetrabutoxide.

A complete understanding of the invention may be obtained from the following typical examples of process showing how the compounds are made and used.

Example 1

In a reaction flask fitted with a mechanical stirrer and reflux condenser were placed 10 g. (0.0354 mole) of 9,10-bis(chloromethyl)-s-octahydroanthracene, 16.3 g. (0.05 mole) of anhydrous lead acetate, and 110 cc. of glacial acetic acid. The solution was stirred and heated at reflux for 3 hours. After cooling, the precipitated solid (lead chloride and lead acetate) was removed by filtration, and the filtrate poured into 500 ml. of water. The precipitated diester was filtered off, washed with water, and dried to give 11.2 g. (96% yield) of 9,10-bis(acetoxymethyl)-s-octahydroanthracene. Crystallization of the product from ethyl alcohol gave colorless needles melting at 172° to 173° C. The analysis agreed closely with that calculated for $C_{20}H_{26}O_4$:

Calculated, percent: Carbon, 72.70; hydrogen, 7.93.
Found, percent: Carbon 72.17; hydrogen, 7.87.

Example 2

A solution containing 33 g. (0.1 mole) of 9,10-bis(acetoxymethyl)-s-octahydroanthracene prepared in Example 1, 300 cc. of ethyl alcohol (95%), and 30 g. (0.75 mole) of sodium hydroxide was heated at reflux for 2 hours. After cooling, the solution was poured into 1.5 liters of water, and the precipitated, colorless solid was filtered, washed with water, and dried. The solid 9,10-bis(hydroxymethyl)-s-octahydroanthracene, melting at 230° to 234° C., was obtained in a yield of 99 percent (24.0 g.). After crystallization from absolute ethanol, it melted at 232° to 234° C. Its analysis agreed closely with that calculated for $C_{16}H_{22}O_2$:

Calculated, percent: Carbon, 78.01; hydrogen, 9.00.
Found, percent: Carbon, 78.21; hydrogen, 8.97.

Example 3

A mixture comprising 6.6 g. (0.02 mole) 9,10-bis(acetoxymethyl)-s-octahydroanthracene and 2.92 g. (0.02 mole) of adipic acid was heated in a slow stream of dry oxygen-free nitrogen for 4 hours at 220° to 230° C. The acetic acid which was formed, distilled out of the reaction flask. A vacuum of 0.5 mm. was then applied, and the heating continued at 225° to 230° C. for an additional 5 hours, while a slow stream of nitrogen was bubbled through the melt. The product comprised a light-colored resin which could be drawn into threads. The resin melted at 175° to 180° C.

Example 4

A reaction flask was charged with 12.3 g. (0.05 mole) 9,10-bis(hydroxymethyl)-s-octahydroanthracene, 9.0 g. (0.052 mole) of dimethyl adipate, and 0.5 cc. of catalyst solution containing 0.014 g. of lithium aluminum tetraethoxide in ethyl alcohol. The catalyst solution was prepared by dissolving 0.5 g. of lithium aluminum hydride in 100 cc. of absolute ethyl alcohol. The reaction mixture was heated at 200° to 210° C. for 5 hours, while a slow stream of dry, oxygen-free nitrogen was passed through the charge. The methyl alcohol formed was distilled from the reaction flask. A vacuum of 0.4 mm. was then applied and the heating continued at 250° to 260° C. for an aditional 4 hours. Fibers were drawn from the clear molten polymer. The polymer cooled to form a tough colorless resin. The polyester resembled chemically the product of Example 3; however, its melting point of 215° to 217° C. was much higher.

Example 5

A reaction flask was charged with 9 g. (0.052 mole) diethyl succinate, 12.3 g. (0.05 mole) 9,10-bis-(hydroxymethyl)-s-octahydroanthracene and 0.5 cc. of lithium aluminum tetraethoxide catalyst solution. The mixture was heated at 205° to 210° C. for 3 hours, while a slow stream of dry, oxygen-free nitrogen was bubbled through the melt. The evolved ethyl alcohol distilled from the reaction flask. The heating was continued for an additional hour at 290° C. under a vacuum of 0.2 mm. The resulting polyester was a light-colored resin melting at 245° to 250° C.

Example 6

In a reaction flask fitted with a mechanical stirrer and reflux condenser were placed 35 g. (0.142 mole) of 9,10-bis-(hydroxymethyl)-s-octahydroanthracene and 250 cc. of anhydrous pyridine. The glycol was partially dissolved. The reaction flask was surrounded by an ice-water cooling mixture, and 40 g. (0.37 mole) of ethyl chloroformate was added in small portions at such a rate that the temperature was maintained between about 10° and 20° C. After the addition was complete (30 minutes), the mixture was stirred for an additional 2 hours at room temperature and then allowed to stand for 20 hours. The reaction mixture was then poured into cold water, and the precipitated solid was filtered off, washed with dilute hydrochloric acid, then with water, and dried at 80° C. under vacuum of 15 mm. The yield of the crude 9,10-bis(hydroxymethyl) - s - octahydroanthracene - bis(ethyl carbonate), melting at 183° to 185° C., was 54.4 g. (98%). After recrystallization from absolute ethanol, the product melted at 184° to 186° C. Its analysis agreed closely with that calculated for $C_{22}H_{30}O_6$:

Calculated, percent: Carbon, 67.67; Hydrogen, 7.74.
Found, percent: Carbon, 67.98; Hydrogen, 7.77.

Example 7

In a 100 cc. three-neck flask fitted with a thermometer, gas inlet tube, and short Vigreaux column was placed 30 g. (0.77 mole) of 9,10-bis(hydroxymethyl)-s-octahydroanthracene-bis-(ethyl carbonate) prepared in Example 6. The product was heated to 200° C., while a slow stream of dry oxygen-free nitrogen was bubbled through the charge, and then 3 drops of titanium butoxide were introduced. The temperature was raised to 240° C. and maintained for 2 hours. During this period, the ethyl carbonate which was formed distilled out of the reaction flask. The solidified reaction mass was heated for 1.5 hours more, and then a vacuum of 0.5 mm. was applied and the heating continued for an additional 1.5 hours at 270° to 285° C. Finally, the temperature was raised to 310° C. and maintained for a short period of time. Upon cooling, the resulting polycarbonate was a tough, hard, and light-colored resin melting at 300° to 305° C.

The present invention is not limited to the examples described above. The novel difunctional derivatives of s-octahydroanthracene may be produced by other methods. Thus 9,10-bis(hydroxymethyl) - s - octahydroanthracene may be prepared, for example, by treating 9,10-bis-(chloromethyl)-s-octahydroanthrocene with alkalies such as sodium hydroxide or potassium hydroxide.

My novel diester, diglycol and bis(carbonate) monomers of s-octahydroanthracene are especially advantageous components of polyester and polycarbonate resins because they impart to the final products such desirable properties as high thermal stability and high melting point. In addition to the polyesters and polycarbonates described hereinabove, other plastic resins may be prepared by copolymerization or cocondensation of these polyesters or polycarbonates with other polymers. The products which may be prepared from my thermoplastic resins include fibers, molded articles, extrusion products, coating materials, and the like.

Although I have disclosed herein the preferred practice of my invention, I intend to cover as well any change or modification therein which may be made without departing from the spirit and scope of the invention.

I claim:
1. A compound of the formula:

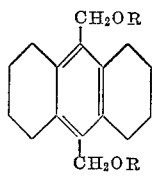

where R is chosen from the group consisting of hydrogen, $COCH_3$ and $COOR_1$, where $R_1$ is chosen from the group consisting of alkyl radicals containing from 1 to 4 carbon atoms.

2. The compound of the formula:

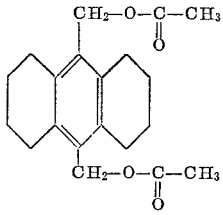

3. The compound of the formula:

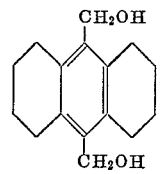

4. A compound of the formula:

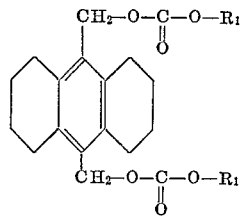

where $R_1$ is chosen from the group consisting of alkyl radicals containing from 1 to 4 carbon atoms.

5. 9,10-bis(hydroxymethyl - s - octahydroanthracene-bis(ethylcarbonate).

6. A polyester resin comprising a polycondensation product of equimolar amounts of 9,10-bis(acetoxymethyl)-s-octahydroanthracene and a saturated $C_2$ to $C_{10}$ dicarboxylic acid.

7. A polyester resin according to claim 6, in which said dicarboxylic acid is adipic acid.

8. A polyester resin comprising a polycondensation product of equimolar amounts of 9,10-bis(hydroxymethyl)-s-octahydroanthracene and a saturated $C_2$ to $C_{10}$ dicarboxylic acid.

9. A polyester resin comprising a polycondensation product of equimolar amounts of 9,10-bis(hydroxymethyl)-s-octahydroanthracene and a saturated $C_2$ to $C_{10}$ dicarboxylic acid ester of $C_1$ to $C_3$ alcohols.

10. A polyester resin according to claim 9, in which said dicarboxylic acid ester is diethylsuccinate.

11. A polyester resin according to claim 9, in which said dicarboxylic acid ester is dimethyl adipate.

12. A linear highly polymeric polycarbonate comprising a self-condensation of a bis (carbonate) monomer of claim 4 in the presence of an ester-interchange catalyst selected from the group consisting of metal alkoxides and alkali metal hydrides.

13. A linear highly polymeric polycarbonate according to claim 12, in which said bis(carbonate) monomer is 9,10-bis(hydroxymethyl)-s-octahydroanthracene - bis (ethylcarbonate).

References Cited

UNITED STATES PATENTS

| | | | |
|---|---|---|---|
| 2,762,789 | 9/1956 | Wotherspoon et al. | 260—75 |
| 2,722,555 | 11/1955 | Amidon | 260—485 |
| 3,244,674 | 4/1966 | Kolobielski | 260—75 |

OTHER REFERENCES

Miller et al., Journal Am. Chem. Soc., vol. 77, pp. 2845–2848, 1955.

WILLIAM H. SHORT, *Primary Examiner.*

H. D. ANDERSON, *Assistant Examiner.*